United States Patent [19]

Marshall, III et al.

[11] 4,090,082
[45] May 16, 1978

[54] CIRCUITRY FOR IMPROVING LINEARITY OF A COUNTING SYSTEM

[75] Inventors: J. Howard Marshall, III, Pasadena; Timothy M. Harrington, Sierra Madre, both of Calif.

[73] Assignee: MDH Industries Inc., Monrovia, Calif.

[21] Appl. No.: 800,801

[22] Filed: May 26, 1977

[51] Int. Cl.² .......................... G01T 1/18; G01R 29/02
[52] U.S. Cl. ...................................... 250/375; 328/129
[58] Field of Search ........................ 250/374, 375, 388; 307/233 R; 328/129

[56] References Cited

U.S. PATENT DOCUMENTS 2,633,540  3/1953  Wilson et al. .......................... 250/375

Primary Examiner—Davis L. Willis
Attorney, Agent, or Firm—Arthur V. Doble

[57] ABSTRACT

An improved system of circuitry for operating an electronic counter connected to a Geiger-Mueller (GM) tube or to a similar source of random pulses with an associated dead time making the system response linear at increased counting rates, includes an electronic one-shot device, an and-gate connected to a pulse counter, a second and-gate connected to an interval counter, and a frequency source for producing periodic clock pulses. When a GM tube is operated as a part of this system, it detects ionizing radiation by producing pulses at a rate proportional to the amount of radiation present. The one-shot inhibits further GM-tube pulses from entering the pulse counter for a fixed time selected to be somewhat longer than the maximum GM-tube dead time, and at the same time it inhibits further periodic clock pulses from entering the interval counter, automatically correcting the measured and displayed pulse count for dead time without regard to the precise value of the dead time of the GM tube or other pulse source.

10 Claims, 2 Drawing Figures

CIRCUITRY FOR IMPROVING LINEARITY OF A COUNTING SYSTEM

BACKGROUND OF THE INVENTION

1. Field of the Invention

This invention relates to apparatus for measuring properties or electrical characteristics in an electrical circuit and more particularly to an apparatus for operating, in a novel way, an electronic counter connected to a Geiger-Mueller (GM) tube for use in detecting ionizing radiation.

2. Description of the Prior Art

Various methods are used to detect ionizing radiation. One common method employs the use of a Geiger-Mueller tube, wherein electrical pulses are produced at a rate determined by the amount of radiation present. The output from a Geiger-Mueller tube is a train of pulses that occur randomly in time characterized by an average pulse-repetition rate that is nearly proportional to the amount of ionizing radiation present within the tube at low radiation levels. Geiger-Mueller tubes are further characterized by a dead time following each pulse that they produce, during which interval they cannot respond to radiation. This dead time makes the response of the Geiger-Mueller tube non-linear at increased radiation levels, as determined through the use of the well-known dead-time equation described and discussed in detail further herein. Because the typical Geiger-Muller tube has a dead time of perhaps 100 $\mu$s, the dead-time correction at 1000 counts/second is already 10%.

Non-linear meter scales and various complex circuits are known to have been used to compensate for dead-time effects, but they are not very accurate nor helpful because the dead time varies from one tube to another and sometimes as a function of radiation level. Furthermore, dead time for a given tube varies over its operating lifetime, varies over changing temperatures and varies due to other physical factors. To perform with good accuracy, frequent recalibrations of the prior-art devices and their circuitry are necessary. The use of the tube itself to control the system dead time does not provide a very reliable, stable or predictable way to provide accurate measurements at high radiation levels.

SUMMARY OF THE INVENTION

Applicants herein have conceived of a new and useful system of circuitry for operating in conjunction with a signal source that produces pulses with a constant average rate that appear randomly in time, with a distribution decribed by Poisson statistics modified by an appreciable dead time, e.g., a Geiger-Mueller tube used to detect ionizing radiation. This circuitry extends the linear dynamic range of average pulse rate over which accurate, repeatable measurements may be obtained by providing a unique means of implementing the correction for dead time to the measurement. The method by which the inventors herein accomplish this correction is to connect to the Geiger-Mueller tube a fixed-duration one-shot circuit, which in turn connects both to a pulse counter and to an interval counter. The one-shot duration is selected to exceed the maximum dead time of the tube, and the one shot is connected in an updating configuration so that the output from the one shot remains present for the one-shot duration following the last pulse from the Geiger-Mueller tube. The one shot allows the pulse counter to count once each time that the Geiger-Mueller tube pulses when the one shot is not active, but it does not allow the pulse counter to count while the one shot is active. Similarly, the one shot inhibits the interval counter from registering elapsed time while the one shot is active, and it enables the interval counter to register elapsed time when the one shot is not active. Because the interval counter controls the time during which the pulse counter accumulates detector pulses, the interval over which pulses from the GM tube are counted is extended automatically to allow for the dead time produced by the one shot, and at any particular instant the true average pulse rate may be determined by dividing the pulse count value by the count value accumulated by the interval counter during the same time as pulses were counted from the GM tube. For convenience the interval controller may be arranged to cause the display and readout of the number in the pulse counter at the end of some selected interval in order that the output value may be directly related to physical quantities. Counts per minute or millirads per hour are two common physical quantities. For verylow Geiger-Mueller-tube pulse rates, the number of counts accumulated by the interval counter closely corresponds to clock time. For example, one count per second from a Geiger-Mueller tube when the one shot was set for 200 $\mu$s would only stretch a one-second interval to 1.0002 seconds. At a higher rate such as 1000 pulses per second, the "one-second" interval would be 1.2 seconds in length. Thus, this stretching technique automatically corrects the measured and displayed pulse count for dead time.

In order to prevent confusion of readings, a live-time-monitoring circuit may be included in the system of circuitry in order to initiate an overload indication whenever the fractional dead time produced by the one-shot circuits exceeds a certain amount. This overload detection prevents paralysis of the system of circuit that could occur at counting rates that are comparable to the reciprocal of the duration of the pulse from the one-shot circuit.

The present invention has several features of novelty over the prior art, including the use of a one-shot circuit and digital techniques for operating an electronic counter and interval controller connected to a Geiger-Mueller tube to make the instrument response linear at increased radiation levels.

This invention has as one of its objects the use of an electronic one-shot circuit to control the system dead time rather than using the Geiger-Mueller tube itself for dead-time control.

It is another object of this invention to provide an electronic circuit which is highly stable and more predictable than those previously used with Geiger-Mueller tubes.

It is another object of this invention to provide a gated interval counter, in a circuit for operating an electronic counter connected to a Geiger-Mueller tube, to determine the interval corresponding to the time during which the system is not dead.

It is another object of this invention to provide a pulse counter for recording the pulses produced by a Geiger-Mueller tube except during system dead time.

It is another object of this invention to provide a timer circuit, in an electronic circuit for use with a Geiger-Mueller tube, to provide an indication of overload when the gated interval counter fails to time out in a preselected interval.

For a better understanding of the present invention, together with other and further objects thereof, reference is made to the following description taken in connection with the accompanying drawings in which a preferred embodiment of this invention is illustrated, the scope of this invention being pointed out and contained in the appended claims.

DESCRIPTION OF THE PREFERRED EMBODIMENT

Figure 1:
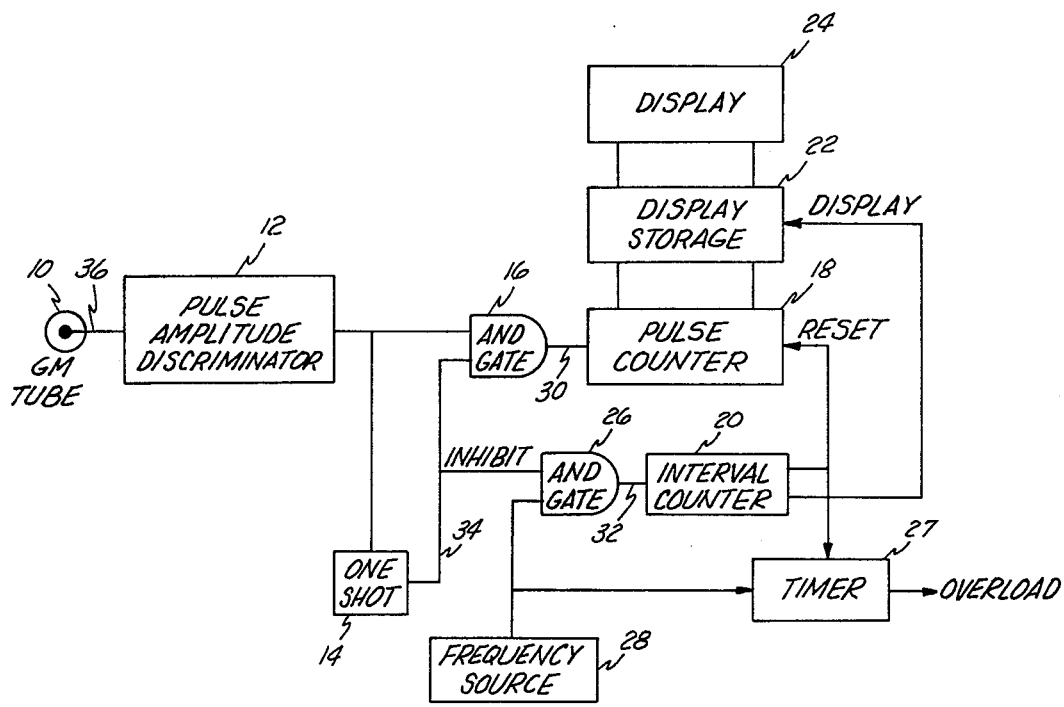
FIG. 1 is a block diagram depicting a preferred embodiment of the invention in terms of functional blocks.

FIG. 1 shows an overall block diagram of the invention. Variable-amplitude pulses from a Geiger-Mueller (GM) tube enter a pulse-amplitude discriminator 12, where they are converted to logic signals with a fixed amplitude. The output from the pulse-amplitude discriminator 12 is applied to a one-shot circuit 14, which produces an inhibit output 34 with a fixed duration following the application of each output pulse from discriminator 12. Furthermore the one shot 14 is designed so that its inhibit output will remain present if a second pulse is applied to its input before the inhibit output from a first pulse has ceased. This type of one shot is known as an updating one shot.

The inhibit output from the one shot 14 is applied to the and-gate 16 in such a manner that the output pulse from pulse-amplitude discriminator 12 is allowed to enter the pulse counter 18 only if the inhibit output from one shot 14 was absent at the time that the output from pulse-amplitude discriminator 12 was present. This gating function thus only allows pulses to be counted in pulse counter 18 if the pulses occur when the inhibit output of one shot 14 is not present.

The pulses counted in pulse counter 18 are accumulated for an interval established by interval counter 20, at the end of which the number of pulses accumulated in pulse counter 18 is transferred to display storage 22 and the pulse counter 18 is reset for a new measurement. The number that was in pulse counter 18 and is now in display storage 22 is read out on display 24. Note that neither the display 24 nor the display storage 22 are a necessary part of this invention. The result of a count may be stored, displayed, or read from the pulse counter 18 in any of several ways. Display 24 and display storage 22 are shown merely for convenience and clarity.

The interval counter 20 determines when the number that the pulse counter 18 has accumulated is to be displayed or otherwise read out. The interval counter 20 causes the display process to occur after a predetermined number of pulses have been applied to its input from the frequency source 28 through and-gate 26. The periodic pulses from frequency source 28 pass through and-gate 26 only when the inhibit output of one shot 14 is not present. Thus the pulses from frequency source 28 enter interval counter 20 only when the inhibit output from one shot 14 is not present. Thus, the effect of the connection of one shot 14 to inhibit and-gates 16 and 26 is to allow pulses from frequency source 28 only to be counted in interval counter 20 when pulses from the pulse amplitude discriminator 12 can be counted in pulse counter 18.

If the duration of the inhibit output from one shot 14 is selected to exceed the maximum value of dead time that the GM tube 10 or an alternate signal source is expected to produce, then one shot 14 rather than the GM tube 10 or an alternative signal source will determine the dead time. Further by allowing frequency-source 28 pulses to be counted only while the dead-time inhibit is not present, by the action of one shot 14 on and-gate 26, the interval counter 20 ignores the time during which the system is dead, and thus there is no need to correct the pulse count in pulse counter 18 for the system dead time.

The timer 27 is connected to the output of interval counter 20 and directly to the frequency source 28. The timer is used to measure clock time, that is, to count the number of frequency-source 28 pulses, between the times that interval counter 20 reaches the end of its interval and resets the pulse counter 18 preparatory to making a new measurement. The duration of the timer 27 is selected to exceed the un-stretched, or zero-pulse-rate, time interval produced by the interval counter 20 by some convenient factor, for example 2. Then if the timer 27 reaches the end of its time before the interval counter 20 times out, an overload indication may be set. This optional feature can be omitted without affecting the basic dead-time-correcting characteristics of this invention.

The term dead time in this discussion refers to the period of time following the detection of an event during which additional events will not produce an output signal. For example, a typical Geiger-Mueller tube used as a radiation detector will respond to ionizing radiation by generating an output signal. For perhaps 100 $\mu$s after generating such an output signal, the tube will not respond to ionizing radiation, after which normal operation resumes. Thus, in this case such a tube has a 100-$\mu$s dead time.

This dead-time effect is well known in the detection of random signals, such as those produced by nuclear radiation, and leads mathematically to the relationship:

$$N_a = N_c/1 - N_cT,$$

where $N_a$ = true counting rate if no dead time existed,
$N_c$ = counting rate observed when the system exhibits a dead time of T units per event, and
T = the dead time expressed in units consistent with the time period over which the rates $N_c$ and $N_a$ are measured.

Thus for the case where the rates were measured in counts per second and the dead time, T, was 100 $\mu$s, then at an observed rate, $N_c$, of 5,000 counts per second the actual rate, $N_a$, would be 10,000 counts per second.

It should be clear that the foregoing discussion also applies to other sources of random pulses such as those produced by other types of radiation detectors or to any process to which the above dead-time equation applies. Furthermore the circuitry of pulse-amplitude discriminator 12 is not essential to the invention if the pulse from the GM tube 10 or other source is compatible with the signal requirements of the logic elements used.

Figure 2:
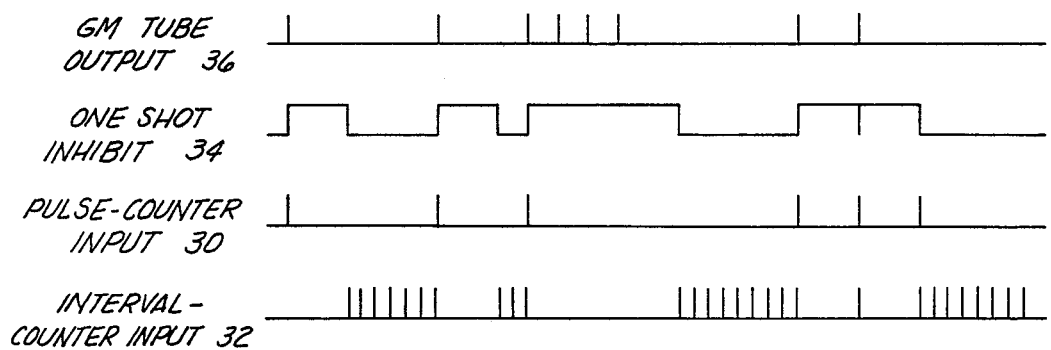
FIG. 2 shows a timing diagram illustrating the signals within the block diagram of FIG. 1 in order to illustrate the operating principle of this invention.

The timing diagram in FIG. 2 illustrates the function of the circuit. In FIG. 1, the pulses from the GM Tube 10, or equivalently from the pulse-amplitude discriminator 12, cause the one shot 14 to produce the inhibit output 34 as illustrated. This signal in turn allows GM tube 10 counts and frequency-source 28 counts to become pulse-counter 30 and interval-counter input 32, respectively. Notice from the timing diagram of FIG. 2 that, whenever the one-shot inhibit output 34 is low, the interval counter runs and GM-tube 10 pulses 36 are counted. After a predetermined number of frequency-source 28 pulses have been allowed into interval counter 20 by the action of and-gate 26, the number in the pulse counter 18 represents the number of GM-tube 10 pulses that occurred while the inhibit output of one shot 14 was not present. Referring to the previous example wherein a 100-$\mu$s dead time and a 10,000-counts-per-second actual rate were encountered, the system shown in FIG. 1 would count 10,000 pulses during 2 seconds of clock time, while being disabled for 1 second, and it would then display a correct result of 10,000 counts per second, because the interval counter would time out after 1 second of live time.

Note that for convenience of operation the time interval could be selected by manual or automatic means to be other than 1 second, thus allowing a choice between more resolution in count rate and smaller relative statistical variations gained by increasing counting time or improved speed of response with decreased percentage accuracy.

What is claimed as new is:

1. For use in an electrical circuit, a method for operating a first pulse counter measuring the average pulse-repetition rate from that type of detector that exhibits a dead time associated with each detected event to make the response of said detector-counter system linear at increased rates of event detection, the method comprising the steps of:
    (a) generating an inhibit signal following the occurrence of an output signal from the detector, the duration of the inhibit signal being chosen to exceed the maximum dead time of the detector;
    (b) suspending operating of a time-measuring circuit for the duration of the inhibit signal;
    (c) simultaneously preventing the first pulse counter from registering the arrival of additional detector pulses for the duration of the inhibit signal; and
    (d) allowing the time-measuring circuit to control the counting interval for the first pulse counter in such a way that the number of detector pulses counted by the first pulse counter is equal to that which would occur if there were no detector dead time;
    whereby the measurement of the average pulse-repetition rate is effected automatically and accurately even if the dead time of the detector changes.

2. The method of claim 1, above, wherein the step of generating an inhibit signal further comprises the step of connecting a one-shot circuit to the detector output signal.

3. The method of claim 2, above, wherein the step of suspending operation of a time-measuring circuit further comprises the step of connecting a source of pulses at a constant frequency through a gate to a second pulse counter, the gate being controlled by the one-shot circuit.

4. The method of claim 3, above, wherein the step of allowing the time-measuring circuit to control the counting interval for the first pulse counter comprises the step of counting pulses in the second pulse counter until the number of said pulses reaches a predetermined value, at which time the counting interval for the first pulse counter is considered complete.

5. The method of claim 4, above, further comprising the steps of transferring the number of pulses counted in the first pulse counter to a display-storage circuit at the completion of the counting interval for the first pulse counter, and displaying the number of stored pulses, whereby a linear response of the detector at increased rates of event detection is indicated.

6. The method of claim 1, above, wherein the detector comprises a Geiger-Mueller tube.

7. For use in an electrical circuit, a method for operating a pulse counter measuring the average pulse-repetition rate from that type of detector that exhibits a dead time associated with each detected event to make the response of said detector-counter system linear at increased rates of event detection, the method comprising the steps of:
    (a) determining the maximum dead time of the detector;
    (b) converting pulses from the detector into signals having a fixed amplitude, which are connected to a one-shot circuit and to a first gate;
    (c) applying the fixed-amplitude signals to a one-shot circuit which produces at its inhibit output a pulse with a time duration selected to be greater than the maximum dead time of the detector;
    (d) connecting the inhibit output from the one-shot circuit to the first gate, which allows the fixed-amplitude detector signals to enter a pulse counter only if a signal at the inhibit output is absent at the time that the fixed-amplitude detector signals were present;
    (e) connecting the inhibit output from the one-shot circuit to the second gate, which passes periodic pulses generated by a frequency source, which is also connected to the second gate, into an interval counter only when the signal at the inhibit output is not present;
    (f) counting pulses in the pulse counter for an interval of time established by the interval counter;
    (g) transferring the number of counts in the pulse counter to a storage register connected to a means for numerical display; and
    (h) displaying the number stored in the storage register;
    whereby a stable compensation for detector dead time is automatically made.

8. The method of claim 7, above, further comprising the steps of determining when the number of pulses stored in the interval counter reaches a predetermined number, and causing the display to change after said predetermined number of pulses has been applied to the interval counter through the second gate.

9. The method of claim 8, above, further comprising the additional step of causing an overflow indication if the interval counter fails to cause the display to change before a second predetermined number of period pulses have occurred.

10. The method of claim 7, above, wherein the detector is a Geiger-Mueller tube.

* * * * *